United States Patent [19]
Maffitt et al.

[11] 4,153,654
[45] May 8, 1979

[54] POLYMERIC OPTICAL ELEMENT HAVING ANTIREFLECTING SURFACE

[75] Inventors: Kent N. Maffitt, Minneapolis; Hubert U. Brueckner, White Bear Lake; Dean R. Lowrey, St. Paul, all of Minn.

[73] Assignee: Minnesota Mining and Manufacturing Company, St. Paul, Minn.

[21] Appl. No.: 902,430

[22] Filed: May 3, 1978

Related U.S. Application Data

[62] Division of Ser. No. 770,044, Feb. 18, 1977, Pat. No. 4,114,983.

[51] Int. Cl.$^2$ .................... B29D 11/00; C23C 15/00; C25D 1/10
[52] U.S. Cl. .................... 264/1; 156/646; 156/663; 204/6; 204/192 E; 264/220
[58] Field of Search .................... 264/1, 2, 219, 220, 264/225, 293; 204/6, 192 E; 427/162, 164, 166; 156/646, 663

[56] References Cited

U.S. PATENT DOCUMENTS

| | | | |
|---|---|---|---|
| 2,461,840 | 2/1949 | Nicoll | 156/646 |
| 2,854,337 | 9/1958 | Pearson | 264/1 |
| 2,875,543 | 3/1959 | Sylvester et al. | 264/1 |
| 3,490,982 | 8/1966 | Sauveniere et al. | 156/15 |
| 3,565,978 | 2/1971 | Folger et al. | 264/220 |
| 3,962,495 | 6/1976 | Feldstein | 264/1 |
| 4,013,465 | 3/1977 | Clapham et al. | 350/276 R |
| 4,019,884 | 4/1977 | Elmer et al. | 65/30 R |

FOREIGN PATENT DOCUMENTS

677784  8/1952  United Kingdom .................... 350/165

*Primary Examiner*—James B. Lowe
*Attorney, Agent, or Firm*—Cruzan Alexander; Donald M. Sell; William B. Barte

[57] ABSTRACT

An optical element of polymeric material is provided with a microstructured surface, thereby rendering the surface substantially non-reflecting while maintaining a high degree of transmissivity. The element is formed via replication from a stamper prepared from a glass original having a similar microstructured surface which is formed by etching a cleaned surface of the glass in vapors of hydrofluoric acid followed by sputter etching with inert gas ions.

14 Claims, 7 Drawing Figures

POLYMERIC OPTICAL ELEMENT HAVING ANTIREFLECTING SURFACE

This application is a division of patent application Ser. No. 770,044, filed Feb. 18, 1977, now U.S. Pat. No. 4,114,983.

BACKGROUND OF THE INVENTION (1) Field of the Invention

This invention relates to optical elements having antireflecting characteristics, especially to such elements in which the antireflection characteristic is provided by a modification of the reflecting surface.

(2) Description of the Prior Art

The desire to improve the performance of optical devices such as lenses and prisms by increasing the transmittance of light therethrough has been long appreciated. In particular, the prior art is replete with optical devices having surfaces coated with antireflecting layers, typically having an optical thickness of one quarter of a wavelength.

Less well known are optical devices in which surface reflections are reduced by altering the surface to provide a gradient in the index of refraction between that of the medium traversed by the incident light, such as air and that of the body of the optical device. One method for providing such an altered surface is disclosed in the Great Britain Pat. No. 29,561, and involves tarnishing glass surfaces in aqueous solutions of sulphuretted hydrogen in order to reduce the reflection of light therefrom. Subsequently, Nicoll (U.S. Pat. No. 2,445,238) disclosed a method for reducing reflections from glass surfaces in which the glass was heated in a vapor of hydrofluoric acid to form a skeletonized surface. Such treated surfaces are quite fragile and are easily damaged by contact with another surface. Furthermore, difficulties in reproducing the skeletonized structures and in maintaining a uniform structure over the entire surface area of optical devices has apparently led workers to develop alternative structures. Contemporaneously with the work of Nicoll, Moulton (U.S. Pat. No. 2,432,484) developed a technique for forming on glass surfaces a nonuniformly dispersed layer of collodial particles containing a random arrangement of peaks to provide the antireflecting characteristics.

It has recently been recognized that moths' eyes contain a regular array of conical protuberances which are believed to suppress reflections by providing a graded refractive index between the air and the cornea and thereby contribute to high degree of nocturnal sensitivity. Bernhard, C. G., Endeavor 26, pp. 79–84 (1967). This recognition has led to the suggestion that a glass lens having such a surface would exhibit similar reductions in reflectivity, but that considerable technological development would be required to make a process for forming such a lens practical. Clapham and Hutley, Nature, Vol. 244, p. 281 (Aug. 3, 1973). Thus, while recent investigators such as Clapham and Hutley appear to have rediscovered what Nicoll and Moulton had earlier noted, namely that a microscopically roughened glass surface or a microscopically rough layer on such a surface could exhibit reduced reflectivity, such recent investigators appear to have but produced a coated glass article having a regular surface pattern which is similar to a structure already known in nature, namely that of a moth's eye. See also U.S. Pat. No. 4013,465 (Clapham and Hutley).

With respect to optical devices formed of polymeric materials, even though such devices are of considerable technological importance, they have not been successfully produced with similar microstructured surfaces. If, in fact, previously known regularly structured surfaces may be used to emboss a structured pattern into softer materials, a great deal of work remained to be done before structures such as simulated moths' eyes can be mass produced. In U.S. Pat. No. 3,490,982 (Sauveniere and Doquire), it is suggested that a glass article having a treated surface may be used as a die for making a plaster cast from which a positive replica could be produced on a thermoplastic material. While such processes are speculated, there has been no successful production or exploitation of optical devices formed of such materials.

SUMMARY OF THE INVENTION

In contrast to the prior art constructions in which glass surfaces have been treated to reduce reflections, the present invention is directed to an optical element comprising a polymeric material in which the surface of the material itself is modified to provide antireflective characteristics. According to the present invention, the polymeric surface is shaped to contain a plurality of randomly positioned peaks, a predominant number of which range in amplitude between approximately 20 and 160 nanometers (nm), i.e., preferably between approximately $\lambda/10$ and $\lambda/4$ where $\lambda$ is the wavelength of radiation reflections of which are to be reduced. The peaks are spaced such that the separation between adjacent peaks is not greater than three times the maximum amplitude of the peaks. Such a structure exhibits a specular reflectance of visible light incident normal to the surface of less than 2% while maintaining the diffuse reflectance at a low level, thereby producing a corresponding increase in transmission. The intensity of light transmitted in one direction is at least $10^3$ greater than the intensity of transmitted visible light measured 5° off that direction.

The shaped surface of the polymeric device of the present invention is formed by pressing a master or stamper having a similar microstructured pattern into the polymeric surface. An original pattern may be prepared by etching a glass surface such as by exposing the surface to acid vapors. However, since the fragile nature of the glass surface precludes direct pressing of that surface onto the polymeric surface, the method of the present invention further includes the step of bombarding the acid etched surface with inert gas ions to remove a portion of the glass surface and to increase the amplitude of the peaks, after which the bombarded surface is replicated into a surface of a polymeric material. In a preferred embodiment, a stamper is formed by electroplating the treated glass surface, which stamper is then used to form the replica on the polymeric surface.

In some cases, the polymeric optical devices of the present invention exhibit reflectances as low as 0.5%, and exhibit a relatively low uniform reflectivity throughout the visible region (380–700 nanometers). In devices formed of typical transparent polymers in which the absorption of light is negligible, this decrease in reflectance produces a corresponding increase in the transmittance of light through the devices. In contrast, untreated polymeric devices typically exhibit reflectances on the order of 4%.

The present invention is thus a significant improvement over prior art polymeric optical elements such as those produced by Hutley, in that a homogeneous article is provided with an antireflecting surface, thereby eliminating the need to separately coat a substrate with a polymeric layer which is then subsequently treated.

Furthermore, while polymeric articles may be provided with a rough or matt surface to reduce specular reflection, such articles do not reduce the total reflection, i.e., in matt finished articles the reduction in specular reflection is obtained at the expense of an increase in the diffuse reflection i.e. scattering. Also, such matt finished surfaces do not contribute to an increase in transmissivity. In contrast, the articles of the present invention achieve a major reduction in specular (i.e., normal) reflection without causing any appreciable increase in the diffuse reflection. Also, this reduction in reflectance is manifested in a corresponding increase in transmissivity.

BRIEF DESCRIPTION OF THE DRAWING

FIGS. 6A, B, C and D, respectively, are curves showing the extent of diffuse scattering, i.e., scattering as a function of angle from normal incidence, for an untreated glass surface, an untreated cellulose acetate butyrate surface, a treated cellulose acetate butyrate surface and a prior art matt finished article.

DESCRIPTION OF THE PREFERRED EMBODIMENTS

Optical elements of the present invention are desirably shaped to provide large area molded fresnel lenses such as those used in overhead projectors, nonreflecting protective glass coverings for display cases and picture frames, watch crystals, eye glasses, conventional molded plastic lenses and the like. Such articles are readily formed from thermoplastic and thermosetting resins and are preferably provided with the antireflecting surface according to the present invention at the same time the other optical surfaces are formed.

Figure 1:
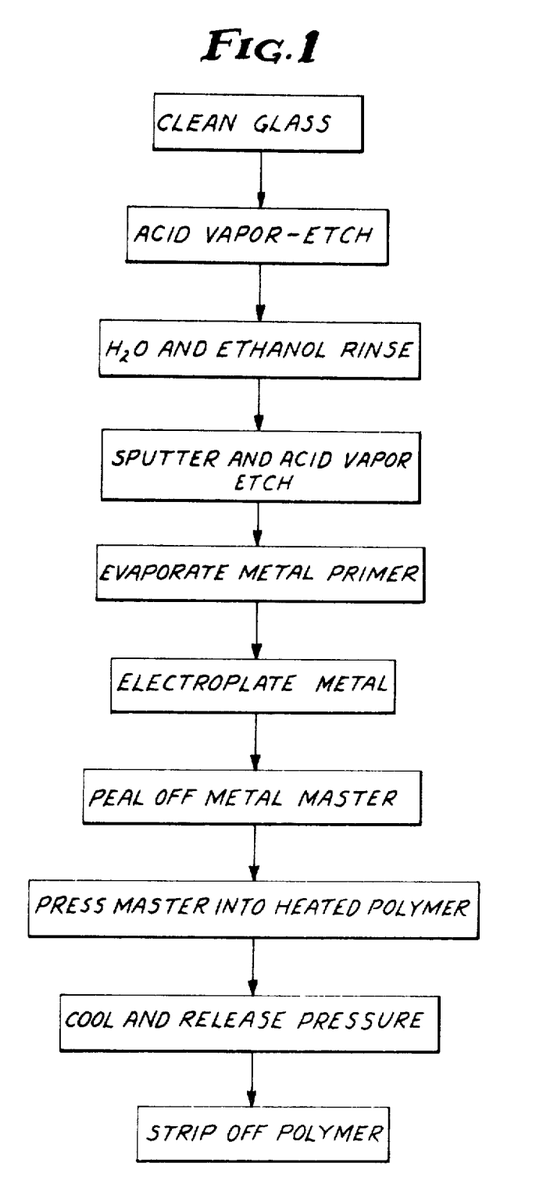
FIG. 1 is a block diagram showing the preferred steps of the method of the present invention.

In a preferred embodiment, the polymeric optical elements of the present invention are made by pressing a stamper having a previously prepared surface into the polymeric surface. Such a stamper is desirably formed as shown in the following eight blocks of the diagram of FIG. 1.

1. A glass article is thoroughly washed and rinsed to ensure the presence of a uniform and homogeneous surface. As shown in FIG. 6A and described in more detail herein, such a surface exhibits virtually no diffuse scattering, i.e., the transmission of visible light in a predetermined direction is at least $10^5$ greater than that transmitted 5° off that direction.

2. This clean glass surface is etched in a vapor of an acid, particularly in vapors of an inorganic acid, such as by securing the glass to the cover of a sealable container having the selected acid concentration therein. Preferably, the temperatures of the acid bath and that of the glass article are controlled to ensure reproducible results. Furthermore, the bath is desirably provided to have a surface at least as large as that of the glass surface being treated such that a substantially constant distance from the surface of the acid bath to the exposed glass surface exists throughout.

In a preferred embodiment, the cleaned surface of the glass article is exposed to vapors of hydrofluoric acid, having a concentration between 1 and 4 percent. Under preferred conditions, the glass surface is maintained at a temperature of approximately 20 to 21° C. while the acid bath temperature is maintained at a temperature between 13 and 15° C., and the glass surface is then etched for a period ranging between 16 and 30 hours.

3. Upon completion of the vapor etch operation, the glass article is washed and rinsed to remove all traces of the acid and to prevent further etching. The resultant etched glass surface establishes an interfacial region between the ambient environment and the bulk material at which the minimum reflectance from the surface may be determined spectrophotometrically. When the surface of the glass article is desirably so treated according to the present invention, the surface is found to contain a plurality of peaks, a predominant number of which range in amplitude between approximately 10 and 50 nanometers. At this stage, the ratio of visible light transmitted in a predetermined direction to that transmitted 5° off of the predetermined direction is substantially the same as that prior to the etch treatment.

4. As shown in the fourth block of the block diagram of FIG. 1, the vapor etched and cleaned surface of the glass article is further treated by sputter etching, such as with an RF diode sputtering system. In this operation, the surface is bombared with inert gas, i.e., noble gas ions, to remove approximately 200 to 300 nonometers of the glass surface, and to increase the amplitude of the peaks such that a predominant number thereof range in amplitude between 20 and 160 nanometers, the separation of adjacent peaks being not greater than 3 times the maximum amplitude of the peak. In a preferred embodiment, the surface is bombarded with argon ions at a pressure ranging between 2 and 15 millitorr. Particularly desirable results have been found to be obtained when such a surface is bombarded with argon ions at a pressure of approximately 5 millitorr for a period ranging between 0.5 and 1 hour.

Figure 2:
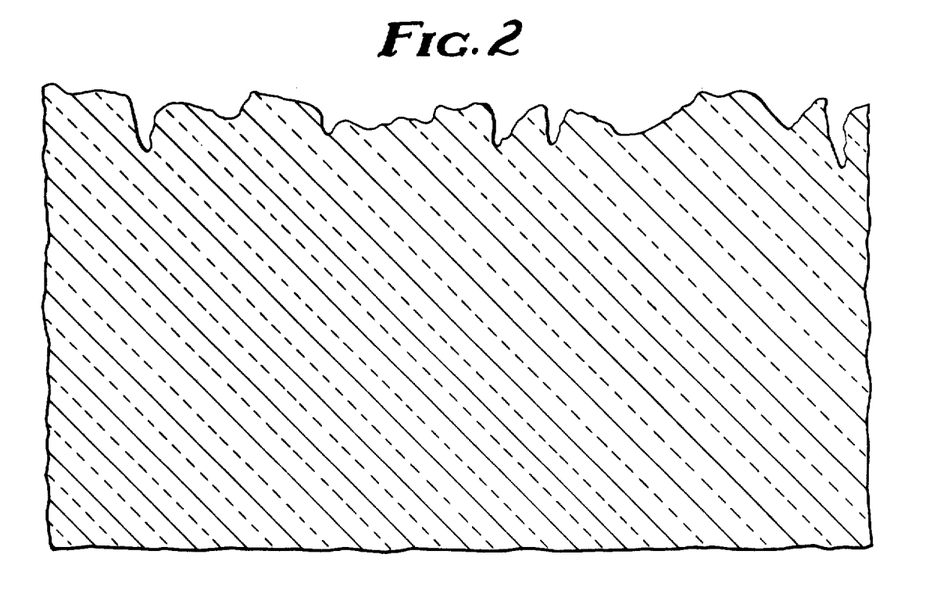
FIG. 2 is a line drawing prepared from an electron micrograph of a cross-section of a structured glass surface prepared according to a portion of the method outlined in FIG. 1.

The topology of such a microstructured surface is revealed by preparing an electron micrograph of a Pt-C replica of a fractured section of the glass article. A typical such surface is shown in FIG. 2. The reflectance of the glass article at this stage in the process typically ranges between 0.8 and 1.3. percent over wavelengths ranging between 400 and 700 nanometers. The ratio of visible light transmitted in a predetermined direction to that measured 5° off of the predetermined direction of the glass article is substantially the same as that prior to the sputter etching operation, i.e., it is substantially the same as that shown in curve A of FIG. 6 as described herein.

The microstructured glass surface prepared at this stage in the process of the present invention exhibits desirable antireflecting characteristics and may be used to prepare a replica in a polymeric article by impressing the treated glass surface into the surface of the polymeric article. A replica of the peaks and protuberances are thereby formed such that the total reflectance of visible light incident normal to the surface of the polymeric article is less than 2 percent.

While a satisfactory, replicated polymeric article may thus be produced during repeated pressings of the glass surface into polymeric surfaces, some of the peaks and proturberances of the microstructured surface of the glass article, which are but loosely adhered to that surface adhere to the polymeric surface. The antireflecting nature of the glass surface is thus degraded and results in polymeric articles which no longer exhibit the requisite low degree of reflectivity.

5. The release characteristics of the treated glass surface are such as to preclude complete release of a metal layer deposited thereon. Accordingly, the glass surface is again vapor etched as in step 2 above, to provide an easily fractured porous layer which functions analogously to a release coating.

6. In order to enable the production of a large number of polymeric optical elements according to the present invention, it is preferable to make a metal replica of the glass microstructured surface as shown in blocks 5 through 7 of the block diagram of FIG. 1. The metal replica may then be used as a stamper to enable the production of many polymeric replicas. In such a preferred embodiment, a metal layer is deposited on the sputter etched glass surface to form on an innersurface of the metal layer a replica of the plurality of peaks. As shown in block 5 of FIG. 1, in one embodiment, it is preferable to first evaporate a metal layer onto the sputter etched glass surface to form a durable replica of the plurality of peaks, to then prepare that metal layer for electroplating. Desirably, the first metal layer comprises a sandwich of a layer of evaporated chromium which provides a hard, wear-resistant replicated surface, followed by a layer of nickel which promotes adhesion of additional layers to the chromium layer and then followed by a copper layer to provide a high conductivity layer which is useful as an electroplating electrode.

7. Upon formation of the evaporated layers, a second metal layer is desirably electroplated onto the evaporated layer to provide a thick body which is adapted for use as a stamper apart from the glass article. Preferably a 0.3 to 1.0 mm thick layer of Ni is thus plated out according to conventional electroplating techniques.

8. As shown in block 7 of the block diagram of FIG. 1, after a thick electroplated body is formed, the composite metal layers may be peeled away from the glass surface, resulting in a metal master which is useful as a stamper and with which numerous replicas may be formed in a large variety of polymeric articles.

9. Replication in polymeric surfaces is a well known process, the particular parameters of which are known to vary depending upon the polymer selected for use in a typical manner, a polymeric body is heated and pressed between the stamper as recited hereinabove and a second stamper having structures to provide the opposite optical surface.

10. After so pressed, the polymeric article is cooled and the pressure is released.

11. Upon release of the pressure, the polymeric article is removed from the masters to provide the final optical element. In one embodiment, opposite surfaces of a microfresnel lens for watch crystals and calculator displays using light emitting diodes may thus be prepared. Under typical conditions, a block containing a large number of such lenses and/or crystals will be simultaneously formed during a single embossing operation.

Figure 3:
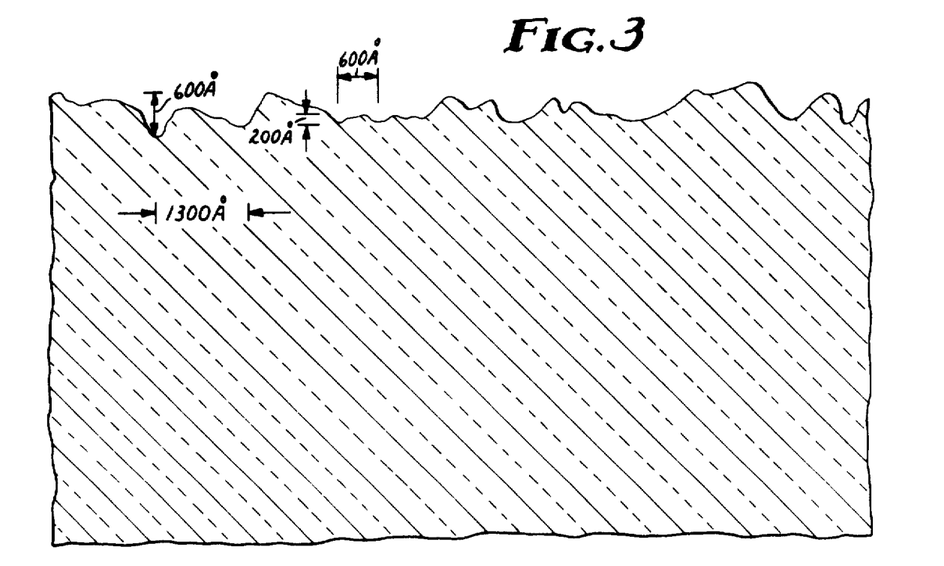
FIG. 3 is a line drawing based on the drawing of FIG. 2 illustrative of a similar surface as replicated in an optical element of the present invention.

The resultant polymeric optical elements have a surface topography containing a plurality of randomly positioned peaks, a predominant number of which range in amplitude between 20 and 160 nanometers. The separation of adjacent peaks is also observed to be not greater than approximately 3 times the maximum amplitude of the adjacent peaks. Such a surface is believed to correspond with the surface topography shown in FIG. 3. While an actual electron micrograph of the cross section of such polymeric articles corresponding to that shown in FIG. 3 has not been prepared inasmuch as the surface becomes smeared during cross-sectioning, it is believed that the surface, such as that shown in FIG. 3, corresponds closely to the surface of the microstructured glass article shown in FIG. 2, but that the peaks exhibit a lower amplitude due to incomplete filling of the polymeric material into the master surface.

A specific example of the formation of polymeric, optical articles according to the present invention is as follows:

1. A 35 cm by 35 cm planar section of soda-lime glass of picture glass quality, such as that manufactured by Libby Owens Ford, Inc., having a grade B surface, an index of refraction of 1.517, a thickness corresponding to a weight of 9 to 11 ounces per square foot (i.e., approximately 1 mm thick) was thoroughly washed in a mild dishwashing liquid detergent such as "JOY", manufactured by Proctor and Gamble, Inc., after which the surface was rinsed with absolute ethanol.

2. An approximately 60 cm by 60 cm square by 15 cm deep polyethylene lined polymethyl methacrylate container fitted with cooling coils to enable temperature control, was filled with a 2 percent solution of hydrofluoric acid and deionized water. A cover of double strength glass having an opening approximately 30 cm by 30 cm square in the center thereof was placed approximately 5 cm above the top surface of the hydrofluoric acid solution and was sealed to the container such as with a pressure sensitive adhesive vinyl tape. The glass plate cleaned as described above was then placed over the opening in the cover and sealed thereto with a similar pressure sensitive adhesive tape. Under such conditions, all portions of the surface of the glass exposed to the solution were approximately 5.3 cm from the top of the solution. The acid bath was maintained at a temperature in the range of 13 to 15° C., such as at 14.4° C.±0.2° C. by passing water at the controlled temperature through the cooling coils. The temperature of the glass plate was maintained by controlling the room temperature and is preferably held at 20° C.±1° C. Under these conditions, the concentration of HF vapor above the bath was approximately 17 parts per million.

3. After thus etching the glass plate for approximately 16 hours, the plate was then removed from the HF environment and was sequentially washed with tap water and absolute ethanol. The reflectance of the thus etched glass surface was found to be approximately 0.6 percent at a wavelength of 530 nanometers. The calculated effective thickness of the etched layer for this sample was 299 nanometers, and the calculated effective index of refraction was 1.331.

4. The vapor etched surface was then bombarded with an RF diode sputtering system in an argon atmosphere at 5 millitorr and a power density of 230 milliwatts per square cm. The bombardment with argon ions was continued for approximately 60 minutes. The reflectance of the microstructured surface was determind to range between 0.8 and 1.3 percent over a range of wavelengths ranging between 400 and 700 nanometers.

5. In order to improve the release characteristics of the treated glass surface from metal layers subsequently applied thereto, it is also preferably to expose the sputter etched surface to the same hydrofluoric acid vapors as discussed in step 2 hereinabove. This provides a porous layer on the sputter etched surface which is easily fractured and thus acts as a release coating on the treated surface. Under such a treatment, the sputter etched surface was exposed to vapors of a 2 percent hydrofluoric acid solution for approximately 3 hours, after which the surface was washed and rinsed as in previous steps. The etched glass plate was then sequentially coated by vacuum evaporation with thin layers of chromium, nickel and copper. To provide such coatings, the glass plate was held in a rotatable fixture in a bell jar, the pressure in the bell jar reduced to approximately $10^{-5}$ Torr using liquid nitrogen trapping of moisture, during which the respective metals were sequentially evaporated onto the slowly rotating surface of the glass plate. The evaporation of the respective metals was continued until the chromium and nickel layers were each approximately 40 nanometers thick and the copper layer was approximately 80 nanometers thick, as was determined with a profilometer. The resulting metal coating was observed to have a resistance in the range of 2 to 5 ohms/square.

6. The metallized microstructural glass surface was then electroplated with nickel, using a conventional electroplating bath to coat the copper surface with a nickel layer approximately 1 mm thick.

7. The resultant integral construction of the vacuum evaporated metal and electroplated metal layers was then peeled from the microstructured glass plate. The exposed chromium surface containing the replica of the glass microstructured surface was washed with a 2 percent solution of hydrofluoric acid to remove any glass particles adhering thereto, and was subsequently rinsed with water. The chromium surface was an accurate replica of the microstructured glass surface, and had a surface topography corresponding to a negative of that depicted in FIG. 2.

8. The metal replicated surface was then used as a stamper to stamp the microstructured surface onto a 0.25 mm thick sheet of cellulose acetate butyrate (CAB). Such a sheet was heated to a temperature of approximately 150° C. for about 5 minutes and was pressed at a pressure of 8.8 kilograms per square cm between the stamper prepared as discussed hereinabove and a stamper providing a fresnel lens surface.

9. The stampers and CAB sheet was then cooled to approximately 60° C. and the pressure released.

10. The CAB sheet was then stripped from the metal masters.

Figure 4:
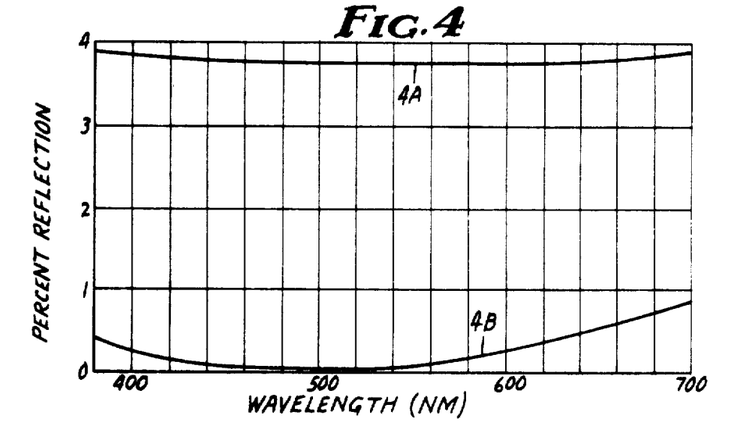
FIGS. 4A and 4B respectively are curves showing the percent total reflectance as a function of wavelength for an untreated cellulose acetate butyrate surface and a cellulose acetate butyrate surface treated pursuant the present invention.

The total reflectance of the CAB article is compared with that of an untreated CAB article in FIG. 4. The curve of the total reflectance for the untreated CAB article (FIG. 4A) indicates that the total reflectance over a range of wavelengths between 400 and 700 nanometers is less than 4 percent. The term "total reflectance" is herein defined to include both light which is specularly as well as that which is diffusely reflected. In contrast, the total reflectance over the same range of wavelengths of the treated CAB article is shown in FIG. 4B to be generally less than 0.5 percent.

Figure 5:
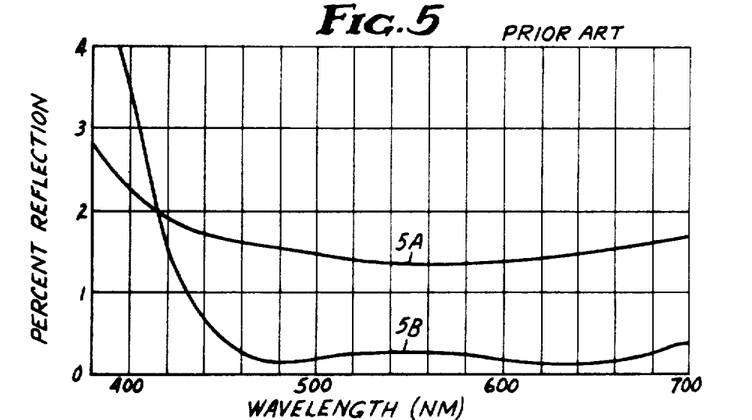
FIGS. 5A and 5B respectively are curves showing the total reflectance prepared as a function of wavelength for structures having prior art antireflecting surfaces.

The advantages obtained in a thus treated surface can be readily appreciated by a comparison of the total reflectivity of articles of the present invention, as shown in FIG. 4B, with that obtained with prior art antireflecting surface treatments for a glass surface such as that having a single layer of magnesium fluoride (FIG. 5A). It may there be seen that such a surface exhibits a total reflectance of less than 2 percent over much of the visible region. Such a reflectance is generally regarded to be the best obtainable via a single thickness coating of that type. FIG. 5B shows the total reflectance spectra for a multilayer high efficiency coating on a glass surface. In that spectra, it may be seen that the total reflectance is less than 0.3 percent over much of the visible spectra. Thus, while the examples of the present invention set forth herein do not show total reflectances as low as that which may be provided by a multilayer high efficiency coating, the reflectances are in the same general range as the best obtainable via a single layer dielectric layer. The present invention represents significant improvements over such structures in that the antireflecting characteristic are provided as an integral part of the optical element, do not require one or more separate coating operations, and are not as strongly dependent upon the angle of incident light as are multilayer coatings.

Figure 6:
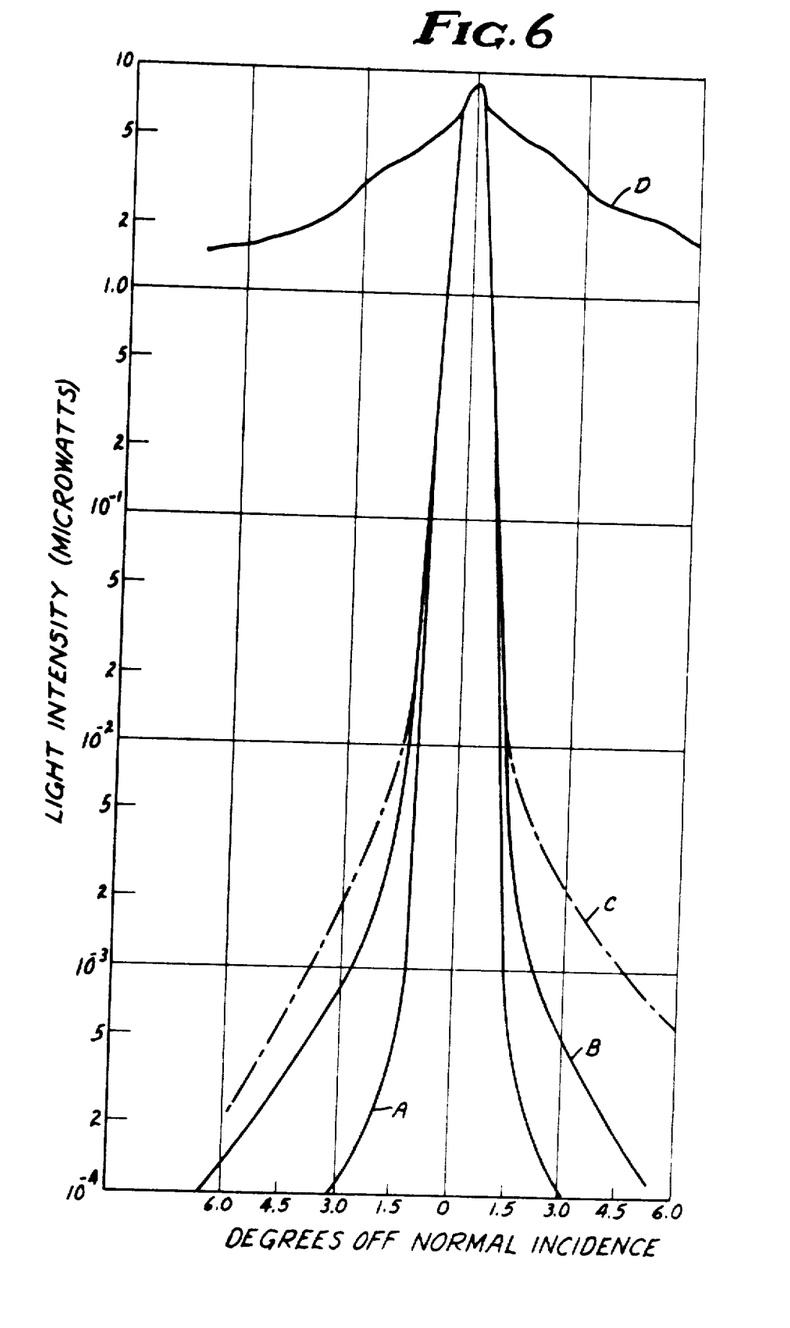

A similar reduction in the specular reflectance from a surface may be achieved by providing a matt type surface, such as, for example, is generally present on a surface of a magnetic recording tape. Such surfaces are, however, unsuitable for typical optical elements wherein the diffuse scattering is not desired, and wherein a reduction in specular reflection is desired so as to provide an attendent increase in the transmission. FIG. 6 is illustrative of the advantage of the present invention over such diffuse scattering articles. In the articles of the present invention, the total reflectance, as shown in FIG. 4B, is maintained below 2 percent, and the angular scattering, as shown in FIG. 6, is maintained below a given value. In the various graphs shown in FIG. 6, the intensity of light scattered from a given object as a function of the angle off the normal incidence, i.e., the angle at which the light impinges on the surface, is plotted semilogarithmically. In FIGS. 6A, B and C, the intensity of light scattered after being transmitted through the article is plotted, whereas in FIG. 6D, the intensity of light reflected from the object is plotted. In FIG. 6A, the intensity of light scattered from a surface of polished glass such as that used as the starting material for the process of the present invention is shown. As may there be seen, the intensity of light scattered at 5° off the normal incidence is below the scale shown in FIG. 6 and is considerably less than 5 orders of magnitude below the peak intensity at normal incidence of approximately 9 microwatts. Curve 6B illustrates the intensity of scattered light from an unstructured surface of cellulose acetate butyrate and indicates that the scattering at 5° off of the normal incidence is nearly the same as that of the polished glass, i.e., approximately 5 orders of magnitude below the peak intensity at normal incidence. The scattering characteristics of articles of the present invention are shown in FIG. 6C, wherein it may be seen that the light scattered at 5° off of the normal incidence has an intensity of approximately $5 \times 10^{-4}$ microwatts. Thus, when contrasted with the peak intensity at normal incidence of approximately 9 microwatts, it may be seen that the scattering at 5° off of normal is still greatly in excess of three orders of magnitude, i.e., approximately four and a half orders of magnitude. In contrast, the light scattered off of a matt finish, such as that reflected off a surface of a magnetic recording tape is shown in FIG. 6D, in which case it may be noted that the light scattered at 5° off normal incidence is approximately only about 4 times less than that reflected at normal incidence.

Figure 7:
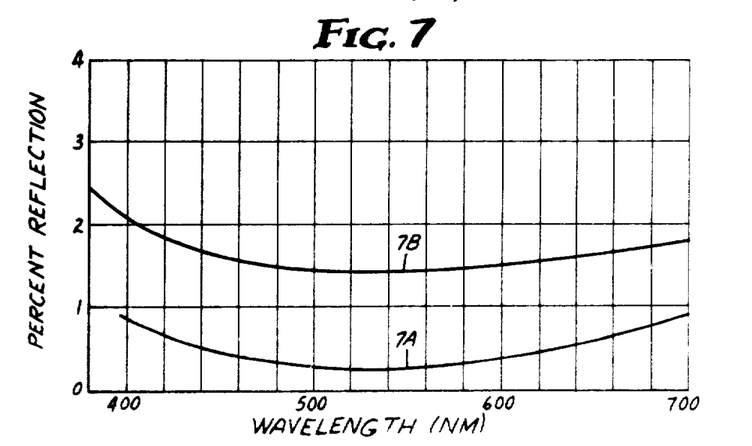
FIGS. 7A and 7B are curves showing the percent total reflectance as a function of wavelength for treated surfaces of polymethyl methacrylate and polypropylene.

While the present invention has thus far been described for use with optical elements formed of cellulose acetate butyrate, it is similarly within the scope of the invention that numerous other organic resins, both thermoplastic and thermosetting types, may be similarly used. In one such embodiment, a sheet of polymethyl methacrylate was pressed between a stamper formed as described hereinabove and a second large area stamper to provide a large area optical device, such as a lens suitable for use in overhead projectors. The reflectance for such an element is shown in FIG. 7A, wherein it may be seen that the total reflectance over the visible range was less than 1 percent. The scattering for such an element is substantially the same as that shown in FIG. 6C.

In another embodiment, a sheet of polypropylene was pressed between a stamper prepared as described hereinabove and a second master to provide an optical element. The reflectance for such an element is shown in FIG. 7B, wherein it may be seen that the reflectance between 400 and 700 A is similarly below 2 percent. It is likewise within the scope of the present invention that other optical elements such as those formed of polycarbonate and polystyrene resins may similarly be provided. Likewise, rather than using thermoplastic resins, various thermosetting resins such as transparent epoxies and the like may be cast by pouring the uncured resin on top of the stamper surface. Such resins may then be cured as appropriate.

Optical elements having the optical characteristics described above have been prepared via repeated pressings from thus prepared stampers. For example, in one test run, after 30 successive replications in CAB, it was found that there was less than 0.1 percent difference in the reflectivity between the first and last reproduction.

In the process for making the etched glass microstructured surface, it is particularly desirable that the glass surface be uniformly etched during the vapor etch and sputter etch operations. Accordingly, it has been found desirable to ensure that the glass is stress-free and that the composition of the glass at the surface is substantially uniform prior to etching. Thus, the method of the present invention may desirably follow the wishing of the glass surface in detergents and rinsing in water and ethanol with the step of bombarding the washed surface with ions to sputter away a portion of the outer surface. In a particularly preferred embodiment, the surface may be bombared with noble gas ions to promote a preferential sputtering of oxygen atoms from the surface, thus resulting in a silicon rich glass surface. Such a bombardment may further include the subsequent bombardment with reactive gas ions to further control the extent of excess silicon on the surface. In a preferred alternative embodiment, the glass surface may be bombarded with argon ions at a pressure of between 2 to 5 millitorr for a period ranging between 4 and 13 hours. Such an operation has been found particularly desirable if the glass has been stored or subjected to a nonuniform stress over a period of time. Alternatively, where "fresh" glass is used, i.e., glass that has been recently annealed or shipped from the supplier, such stresses eliminating treatments may be unnecessary.

In order to provide a uniform antireflecting surface over large areas, such as would be useful in fresnel lenses designed for overhead projectors and the like, where the cross sectional area of the lens may exceed 1500 square centimeters, it is essential that the etching conditions be such as to provide uniform etching over such an area. Accordingly, it is crucial that the conditions over which the surface of the glass is exposed to the HF vapors be uniform over the entire surface. Thus, while the example given above sets forth a preferred set of conditions for a given glass surface, it has been found that satisfactory surfaces will be obtained with other acids, concentrations, temperatures and exposure times, depending upon the glass selected. Such variations in the vapor etch conditions are known to those skilled in the art and as may, for example, be seen in the above-cited patent of Nicoll (U.S. Pat. No. 2,445,238). Thus, for example, while the above example discloses only the use of hydrofluoric acid, it is also within the teaching of the present invention that similar etching may be obtained by uniformly exposing the glass surface to vapors of other inorganic acids.

While the examples set forth hereinabove for preparing the optical element have been directed to a preferred method in which glass surfaces are controllably etched, it is also recognized that other treatments may be utilized to provide a microstructured surface which can be replicated into a polymeric surface. For example, metal surfaces may be directly etched to provide similar surfaces. Likewise, metal surfaces may be oxidized and selectively treated to form a microstructured surface as disclosed and claimed in a copending patent application by Messrs. Dorer and Mikelsons, U.S. Pat. Ser. No. 770043 filed Feb. 18, 1977. Nonuniform precipitates on glass or other surfaces such as the structure disclosed by Moulton (U.S. Pat. No. 2,432,484) may also be employed.

Having thus described the present invention, what is claimed is:

1. A method of forming an antireflecting surface on a polymeric optical element, said method comprising the steps of:
    (a) providing a glass article having a uniform and homogeneous glass surface through which the transmission of visible light in a predetermined direction is at least $10^5$ greater than the transmission measured 5° off the predetermined direction.
    (b) vapor etching the homogeneous glass surface by exposing said surface of vapors of an acid to etch into the surface a plurality of peaks, a predominant number of which range in amplitude between approximately 10 and 50 nm, the ratio of visible light transmission in a predetermined direction to that transmitted 5° off the predetermined direction being substantially unchanged,
    (c) sputter etching the acid etched surface with inert gas ions to remove approximately 200–300 nm of the glass surface and to increase the amplitude of the peaks such that a predominant number thereof range in amplitude between 20 and 160 nm, the separation of adjacent peaks being not greater than three times the maximum amplitude of said peaks, and (d) replicating the sputter etched surface into a surface of a polymeric material to form in the polymeric surface a replica of said plurality of peaks, whereby the total reflectance of visible light incident normal to said surface is less than 2%.

2. A method according to claim 1, wherein step (a) further comprises treating the glass article to remove a surface layer therefrom to provide a homogeneous glass surface substantially free from internal stress.

3. A method according to claim 1, wherein step (a) comprises washing the glass surface in a solution of detergent and distilled $H_2O$, followed by a distilled $H_2O$ rinse and subsequent rinse in ethanol.

4. A method according to claim 1, wherein step (a) further comprises bombarding the glass surface with ions to sputter away an outer portion of the glass surface.

5. A method according to claim 4, wherein the glass surface is bombared with noble gas ions to promote preferential sputtering of oxygen atoms from the glass surface to result in a silicon rich glass surface.

6. A method according to claim 5, wherein the silicon rich glass surface is bombarded with reactive gas ions to control the extent of excess silicon on the surface.

7. A method according to claim 4, wherein the glass surface is bombarded with argon ions at a pressure of between 2-5 millitorr for a period ranging between 4 and 13 hours to remove as much as one micrometer of surface layer to ensure the presence of said uniform and homogeneous glass surface.

8. A method according to claim 1, wherein step (b) comprises exposing said glass surface to vapors of an inorganic acid.

9. A method according to claim 8, wherein step (b) comprises maintaining said glass surface at a temperature of approximately 20°-21° C. and exposing said glass surface to vapors of HF having a concentration ranging between 1% and 4% at a bath temperature between 13° and 15° C. for a period ranging between 16 and 30 hours.

10. A method according to claim 1, wherein step (c) comprises bombarding the etched glass surface with argon ions at a pressure ranging between 1-15 millitorr.

11. A method according to claim 10, wherein step (c) comprises bombarding the etched glass surface with argon ions at a pressure of approximately 5 millitorr for a period ranging between 0.5 and one hour.

12. A method according to claim 1, wherein step (d) comprises the steps of depositing a metal layer onto the sputter etched surface to form on an inner surface of said layer a replica of said plurality of peaks and removing the glass article from the layer to expose the replica of said plurality of peaks on the inner surface.

13. A method according to claim 12, wherein step (d) comprises evaporating a first metal layer onto the sputter etched surface to form a said replica of said plurality of peaks, preparing said replica for electroplating, and electroplating a second metal layer onto said replica to provide a thick body adapted for use as a stamper apart from the glass article.

14. A method according to claim 13, wherein step (d) comprises evaporating as the first metal layer a layer of chromium to provide a hard, wear-resistant replicated surface, evaporating a layer of nickel to promote adhesion of additional layers to the chromium layer, evaporating a copper layer onto the nickel layer to provide a high conductivity layer useful as an electroplating electrode, and electroplating nickel onto the copper layer to form said thick body.

* * * * *